(12) United States Patent
Demersseman et al.

(10) Patent No.: US 6,688,331 B2
(45) Date of Patent: Feb. 10, 2004

(54) SUPPORT FOR A CONNECTOR

(75) Inventors: Rémi Demersseman, Paris (FR); Philippe Come, Senlis (FR); François Gaffe, Rosny-sous-Bois (FR)

(73) Assignee: Robert Bosch GmbH, Stuttgart (DE)

( * ) Notice: Subject to any disclaimer, the term of this patent is extended or adjusted under 35 U.S.C. 154(b) by 297 days.

(21) Appl. No.: 09/869,673

(22) PCT Filed: Jun. 5, 2001

(86) PCT No.: PCT/FR01/01733
§ 371 (c)(1),
(2), (4) Date: Jul. 2, 2001

(87) PCT Pub. No.: WO01/94171
PCT Pub. Date: Dec. 13, 2001

(65) Prior Publication Data
US 2003/0047990 A1 Mar. 13, 2003

(30) Foreign Application Priority Data
Jun. 9, 2000 (FR) .............................................. 00 07966

(51) Int. Cl.$^7$ ................................................ E03B 11/00
(52) U.S. Cl. ........................... 137/571; 60/585; 285/18; 285/124.1
(58) Field of Search .......................... 60/585; 137/571, 137/575; 285/18, 124.1, 124.2, 124.3, 124.4, 124.5

(56) References Cited

U.S. PATENT DOCUMENTS

| | | | | | |
|---|---|---|---|---|---|
| 2,316,218 A | * | 4/1943 | Birch | ...................... | 285/124.5 |
| 2,876,023 A | * | 3/1959 | Ford | ........................ | 285/124.4 |
| 3,583,710 A | * | 6/1971 | Burelle | ........................ | 285/111 |
| 3,825,287 A | * | 7/1974 | Erickson et al. | ......... | 285/124.3 |
| 4,441,520 A | * | 4/1984 | Bruso et al. | ................... | 60/585 |
| 4,489,556 A | * | 12/1984 | Komorizono et al. | ......... | 60/585 |
| 4,505,113 A | * | 3/1985 | Reinartz et al. | ............... | 60/535 |
| 4,566,276 A | * | 1/1986 | Komorizono et al. | ......... | 60/585 |
| 4,674,282 A | * | 6/1987 | Quiney et al. | ................. | 60/585 |
| 4,995,646 A | * | 2/1991 | Johnston et al. | ......... | 285/124.3 |
| 5,139,287 A | * | 8/1992 | Broere | ..................... | 285/124.1 |
| 5,201,552 A | * | 4/1993 | Hohmann et al. | ....... | 285/124.4 |

\* cited by examiner

Primary Examiner—John Rivell

(57) ABSTRACT

A support (1) through which first and second outlet pipes (7) from a first tank (9) is connected to a second tank (42). The support (1) has rear wall (17) separated from a front wall (37) by a spacer (39) to define rectangular cavities (33) therein. The rear wall (17) has a first and second sleeves (5) that extend therefrom and are correspondingly located in the outlet pipes (7). The front wall (37) has openings (35) therein that are aligned with openings (3) defined by the first and second sleeves (5). First and second claw rings (15) are correspondingly attached to the first and second sleeves (5) and first and second tubular pipes (41.1,41.2) are pushed through the claw rings (15) and into the first and second outlet pipes (7). Radial protrusions (13) on the claw rings (15) engage the tubular pipes (41.1,41.2) to define a sealed connection. A tool (23) may be inserted into the rectangular cavities (33) and guided into engagement with the radial protrusions (13) to thereafter terminate the sealed connection.

2 Claims, 9 Drawing Sheets

SUPPORT FOR A CONNECTOR

This invention mainly relates to a support for a quick connector intended for a brake-fluid tank, and to a brake-fluid tank fitted with such support. The braking systems are usually provided with two hydraulic braking circuits having a tandem master cylinder which supplies, on the actuation of the brake pedal by the driver, a high-pressure brake fluid capable of operating the brakes at the motor vehicle wheels. The braking system of a known type further comprises a brake-fluid tank having a first distribution port for the supply of an inlet port of the primary circuit of the tandem master cylinder, and a second distribution port for the supply of an inlet port of a secondary circuit of the tandem master cylinder. Conventionally, the brake-fluid tank has a partition wall, extending vertically or substantially vertically from the bottom, on part of the tank height and defining two separate chambers in the tank, which are simultaneously fed when the tank is filled through a filling port.

Besides, the Patent Application EP 98 944 011.0, incorporated herein by way of reference, discloses a safety supply device for a dual hydraulic braking circuitry comprising a first high-capacity top tank, which is connected by means of a single flexible tubular pipe to a second lower-capacity bottom tank. The second lower-capacity bottom tank alone is fitted with a partition wall defining two separate brake-fluid chambers.

Though satisfying on the whole, the safety achieved through the device described in EP 98 944 011.0 may be improved still further. As a matter of fact, a leakage in any brake circuit (primary or secondary) will lead to the outflow of the brake fluid from the top tank. As a result of which, only the fluid reserve, defined by the partition wall in the bottom tank, will be available for the non-leaking brake circuit which, under such circumstances, will take charge of the whole braking operation.

Therefore, it is an object of the present invention to provide a braking system, having a high reliability including in a reduced mode after a partial failure.

Another object of this invention consists in providing a braking system comprising two separate brake circuits, wherein a possible leakage in one of said circuits has no effect whatsoever on the brake-fluid supply of the other circuit.

It is also an object of the present invention to provide a braking system allowing, on the assembly of the motor vehicle, an easy mounting of the brake-fluid supply devices.

It is another object of this invention to provide a brake-fluid supply device for an improved filling operation and for an easier visual level checking by the end user.

These objects are achieved, in accordance with this invention, by a double brake-fluid supply device, comprising a first top tank having two separate brake-fluid chambers, a second bottom tank having two separate brake-fluid chambers, as well as two tubular pipes, wherein a first tubular pipe connects a first top-tank chamber to a first bottom-tank chamber, whereas the second tubular pipe connects the second top-tank chamber, the holding capacity of which is different from that of said first top-tank chamber, to a second bottom-tank chamber, the holding capacity of which is also different from that of said first bottom-tank chamber.

The main subject of this invention is a support for a connector, intended for a tubular pipe of a brake-fluid tank, characterised in that it comprises a first through-hole for the passage of a first brake-fluid supply tubular pipe and a second through-hole for the passage of a second brake-fluid supply tubular pipe, which is adjacent and the axis of which is parallel or substantially parallel to the axis of the first through-hole for the first tubular pipe.

The present invention also deals with a support, characterised in that said support is a support for a quick connector.

Another subject matter still of the present invention is a support, characterised in that it comprises an accommodating cavity for a tool intended for the disconnection of the tubular pipes.

According to another aspect of the invention, a brake-fluid tank is characterised in that it comprises a support which is made integral with the end parts of both outlet pipes of the brake-fluid tank.

The present invention also deals with a tank, characterised in that the inner diameter of the support through-hole is smaller than the inner diameter of the tank pipe, so as to form a shoulder for a radial protrusion of a quick connector for tubular pipes.

Another subject matter still of the present invention is a tank, characterised in that the support comprises sleeves, which define the through-holes for the passage of the tubular pipes, said sleeves entering the mouths of the tank pipes.

According to another aspect of the invention, a brake-fluid supply system comprises a first top tank provided with two brake-fluid chambers, each one being connected, through a tubular pipe, to a chamber in a second bottom tank, wherein each one of the two chambers of the second bottom tank is fitted with connecting means for a brake circuit of a motor vehicle.

A brake-fluid supply system according to this invention is characterised in that the tubular pipes are flexible tubular pipes.

Another subject of the invention is a brake-fluid supply system, characterised in that the brake-fluid chambers in the second bottom tank form two chambers, which are tight each with respect to the other.

Another subject matter still of the present invention is a brake-fluid supply system, characterised in that the brake-fluid chambers in the second bottom tank are tight with respect to the atmosphere.

In an advantageous manner, the second bottom tank is directly made integral with a tandem master cylinder, whereas the top tank is arranged in a place readily visible and/or accessible by the user of the motor vehicle.

Advantageously too, the tubular pipes interconnecting the tanks are flexible tubular pipes.

Judiciously, the first and second chambers of the top tank are tight each with respect to the other but connected to the atmosphere by means of a vent pipe.

On the other hand, the first and second chambers of the bottom tank are hermetically separated both mutually and with respect to the atmosphere.

In an advantageous manner, the top and/or bottom tanks are fitted with quick connectors for the quick connection/disconnection in the course of assembling or maintenance operations concerning the flexible tubular pipes.

Other features and advantages of the present invention will be apparent from the following detailed description, by way of example and by no means as a limitation, when taken in conjunction with the accompanying drawings, in which.

Figure 2:
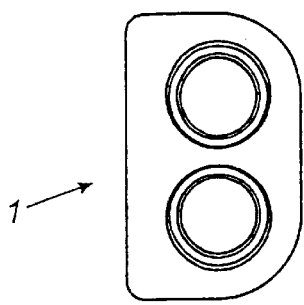
FIG. 2 is a plan view of the front face of the preferred embodiment of a support for a quick connector according to the present invention.
Figure 6:
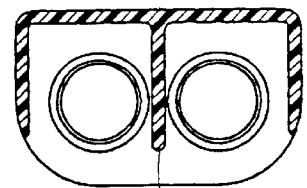
FIG. 6 is a longitudinal sectional view along line VI—VI of FIG. 4.
Figure 5:
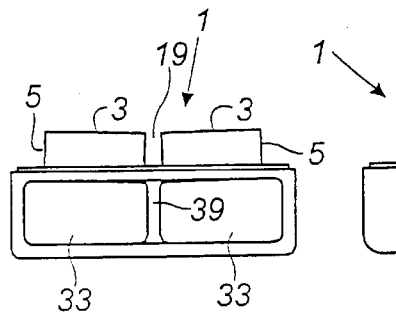
FIG. 5 is a top view of the preferred embodiment of a support for a quick connector according to the present invention.

In FIGS. 1 through 17, the same reference numerals will designate the same elements.

Figure 17:
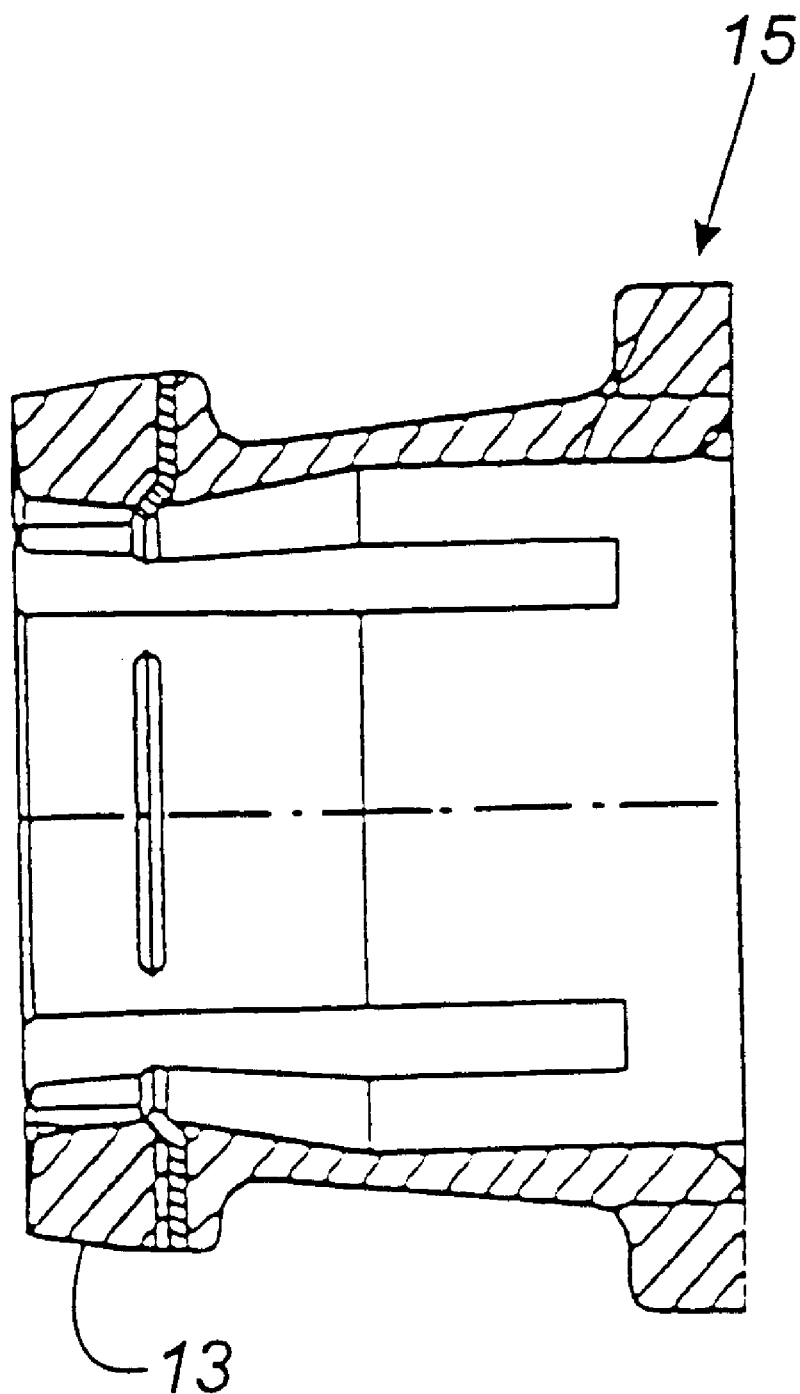
FIG. 17 is an axial sectional view of a claw ring, cooperating with a support for a quick connector according to the invention.

FIGS. 1 through 9 show the preferred embodiment of a small-size support for a connector according to the present invention, which is quite compatible with the available room under the engine hood. In a manner to be further described herebelow in conjunction with FIGS. 11 and 12, quick connectors are advantageously used, e.g. connectors having a claw ring, like that marketed by the John GUEST Company, and as illustrated in FIG. 17. The support according to this invention has two through-holes 3, advantageously adjacent and with parallel or substantially parallel axes, for the passage of tubular pipes, preferably flexible tubular pipes. Each through-hole 3 is defined by a sleeve 5, the radially-inner diameter of which is smaller than the radially-inner diameter of an outlet pipe 7 of a tank 9, which fact is more particularly illustrated in FIG. 11. Thus, the end part 11 of the sleeve 5 forms an axial retaining shoulder for a radial protrusion 13 of the claw ring 15 according to FIG. 17. It should be noted that said shoulder, resulting from a change in the inner diameter, requires the use of a connector support 1 added to the tank 9 since a tank made in one block would mean a hardly strippable casting, not to say unremovable from the mould. Therefore, the support 1 according to the present invention has a rear face 17 intended to be rigidly bound to the outlets of the pipes 7 in the tank 9, either by adhesive bonding or by welding.

In the same way and in an advantageous manner, the sleeves 5 are close to each other, so as to define a receiving cavity 19 for a common wall 21 at their meeting point with both pipes 7 of the tank according to the invention. Thanks to the use of a wall 21, which is common to the pipes 7, the space required by the tank 9 can be considerably reduced, compared with that occupied in the case of two completely separate pipes 7. Besides, it provides some stiffening of the assembly.

Maintenance operations carried out on the motor vehicle may entail the disconnection of the flexible tubular pipes. In the illustrated preferred embodiment of the support 1 according to this invention, such support comprises means capable of cooperating with a quick-disconnecting tool 23 for flexible tubular pipes. The disconnecting tool 23 comprises, for instance, ramps 25 which border each one of the two U-shaped slots 27 for the simultaneous applying of the tool 23 on both flexible tubular pipes to be disconnected. In the present advantageous embodiment, the ramps 25 are flanked with cheeks 29, located on the outer edges of the tool 23 and the thickness of which corresponds to the substantially constant thickness of the tool. On the opposite side with respect to the slots 27, the tool 23 is provided with an advantageously striated gripping area 31. The support 1 according to the present invention comprises a cavity 33 intended for the accommodating and guiding of the disconnecting tool 23, perpendicularly to the parallel or substantially parallel axes of the flexible tubular pipes.

In the preferred embodiment as illustrated, the accommodating cavity 33 has a substantially rectangular shape with rounded-off angles at the lower part, near the opening for the insertion of the tool 23. Through-holes 35 for the passage of flexible tubular pipe(s) are arranged opposite the through-holes 3 and they are provided in the front face 37, substantially parallel to the rear face 17 of the support 1 according to this invention. A stiffening rib 39 advantageously links the rear wall 17 with the front wall 37, between the through-holes 3 and 35, corresponding to both of the flexible tubular pipes.

Figure 12:
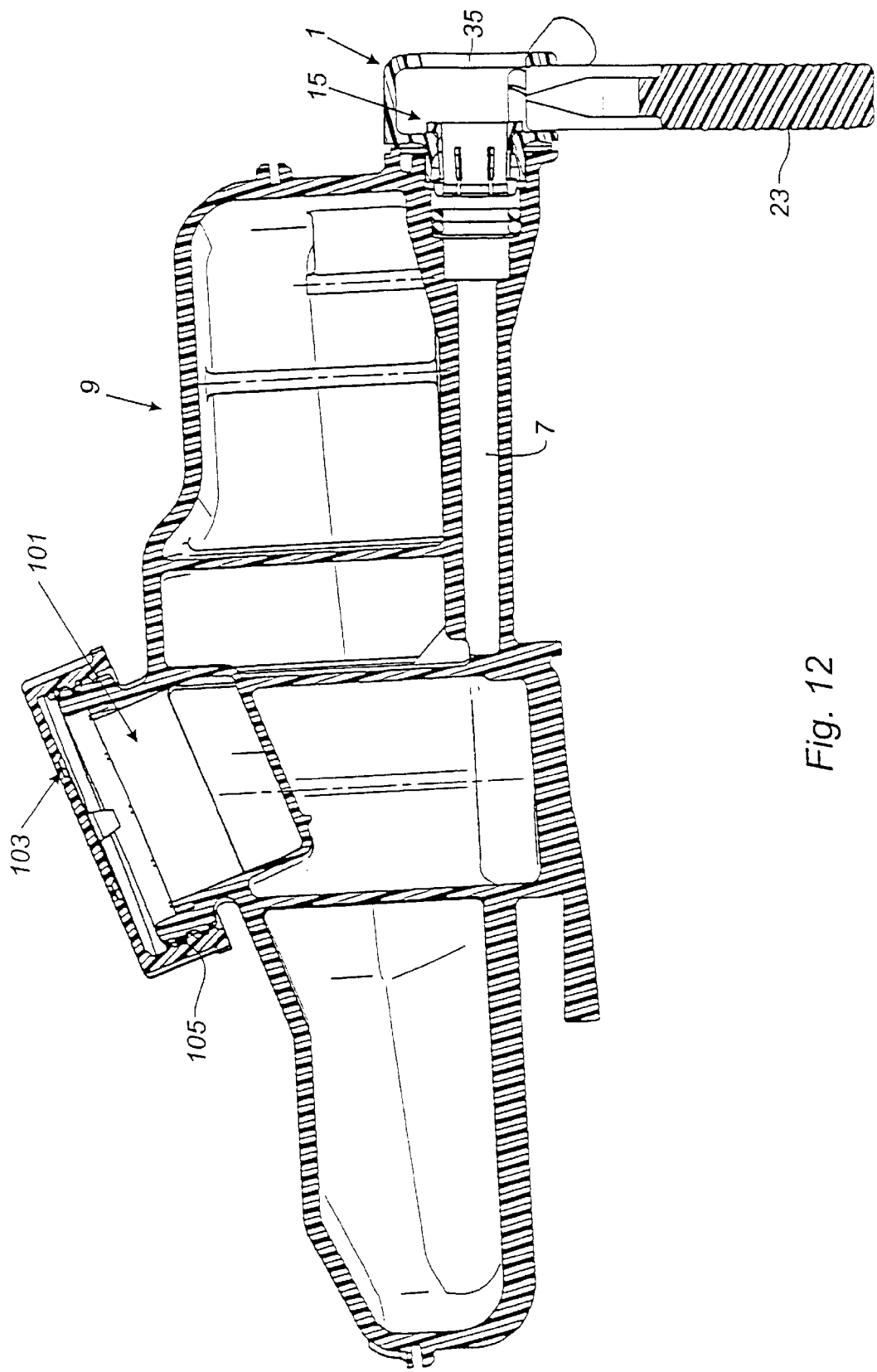
FIG. 12 is a longitudinal sectional view of a tank in a plane perpendicular to the sectional plane of FIG. 11, showing how it cooperates with a tool intended for the disconnection of flexible tubular pipes from a support for a quick connector according to the present invention.

FIG. 12 shows the embodiment of a top tank 9 according to this invention, which has a filling port 101, advantageously a sleeve. Said port cooperates with closing means, in an advantageous manner a cap 103 engaging with a thread 105 on the outer wall of the port 101. Said top tank 9 comprises at least two brake-fluid chambers, which are tight each with respect to the other but connected to the atmosphere by means of a vent pipe.

Figure 1:
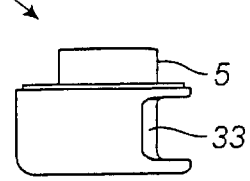
FIG. 1 is a side view of the preferred embodiment of a support for a quick connector according to the present invention.
Figure 4:
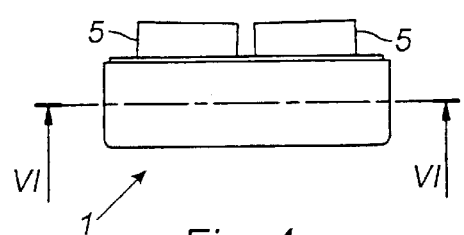
FIG. 4 is a bottom view of the preferred embodiment of a support for a quick connector according to the present invention.
Figure 3:
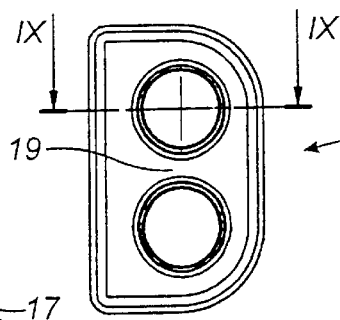
FIG. 3 is a plan view of the rear face of the preferred embodiment of a support for a quick connector according to the present invention.
Figure 7:
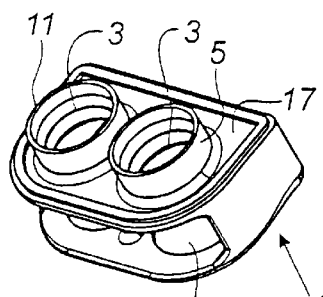
FIG. 7 is a three-quarter rear perspective view of the preferred embodiment of a support for a quick connector according to the present invention.
Figure 8:
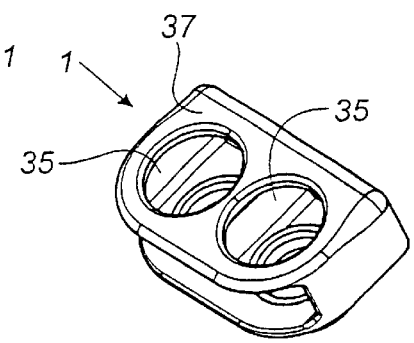
FIG. 8 is a three-quarter front perspective view of the preferred embodiment of a support for a quick connector according to the present invention.
Figure 9:
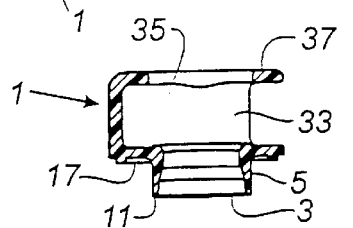
FIG. 9 is a cross-sectional view along line IX—IX of FIG. 3.

The top tank 9 is connected to a brake system through ducts, advantageously two pipes 7. A support for a quick connector, as shown in FIG. 1, facilitates the connection to the brake system.

The pipes 7 mouth into the top tank 9 in two separate brake-fluid chambers, which are conventionally defined by a partition wall, extending vertically or substantially vertically from the bottom, on part of the height of the top tank 9, and defining two separate holding capacities. The chambers are simultaneously fed when the tank is filled through the filling port.

In an advantageous way, the top tank 9 comprises reference marks for the brake-fluid level within the top tank, preferably two means, i.e. ideally the first means may consist of indicators, advantageously markings on the side wall of the top tank, showing the maximum level and the minimum level of the brake fluid.

Since the wall (not shown) of the top tank 9 should make the brake fluid visible to the eye, at least at the indicator, ideally the second means may consist of electrical means, advantageously a well-known system comprising a float with an electric contact.

Figure 10:
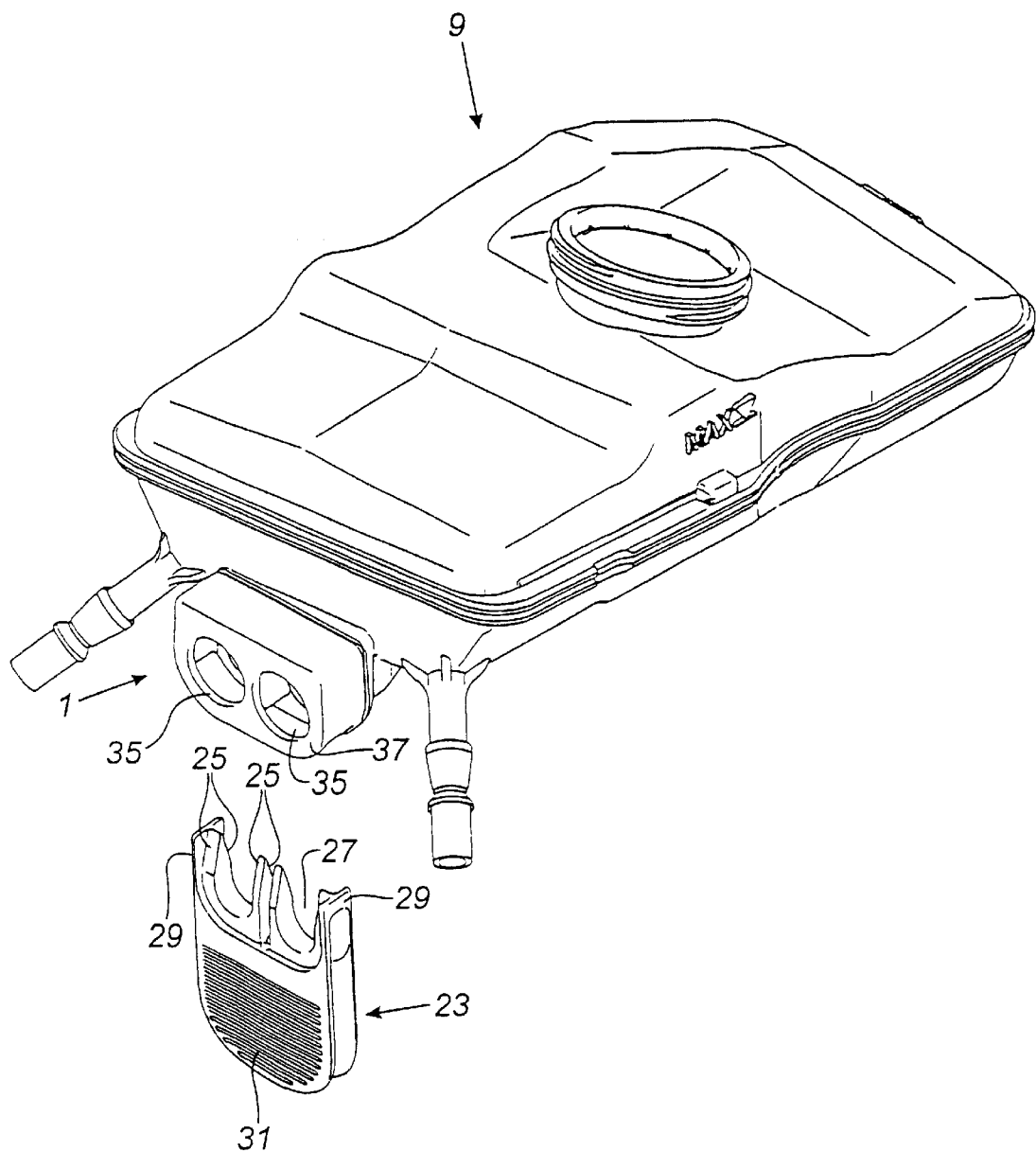
FIG. 10 is a three-quarter perspective view of the preferred embodiment of a tank according to this invention and of a tool intended for the disconnection of flexible tubular pipes from a support for a quick connector according to the present invention.
Figure 11:
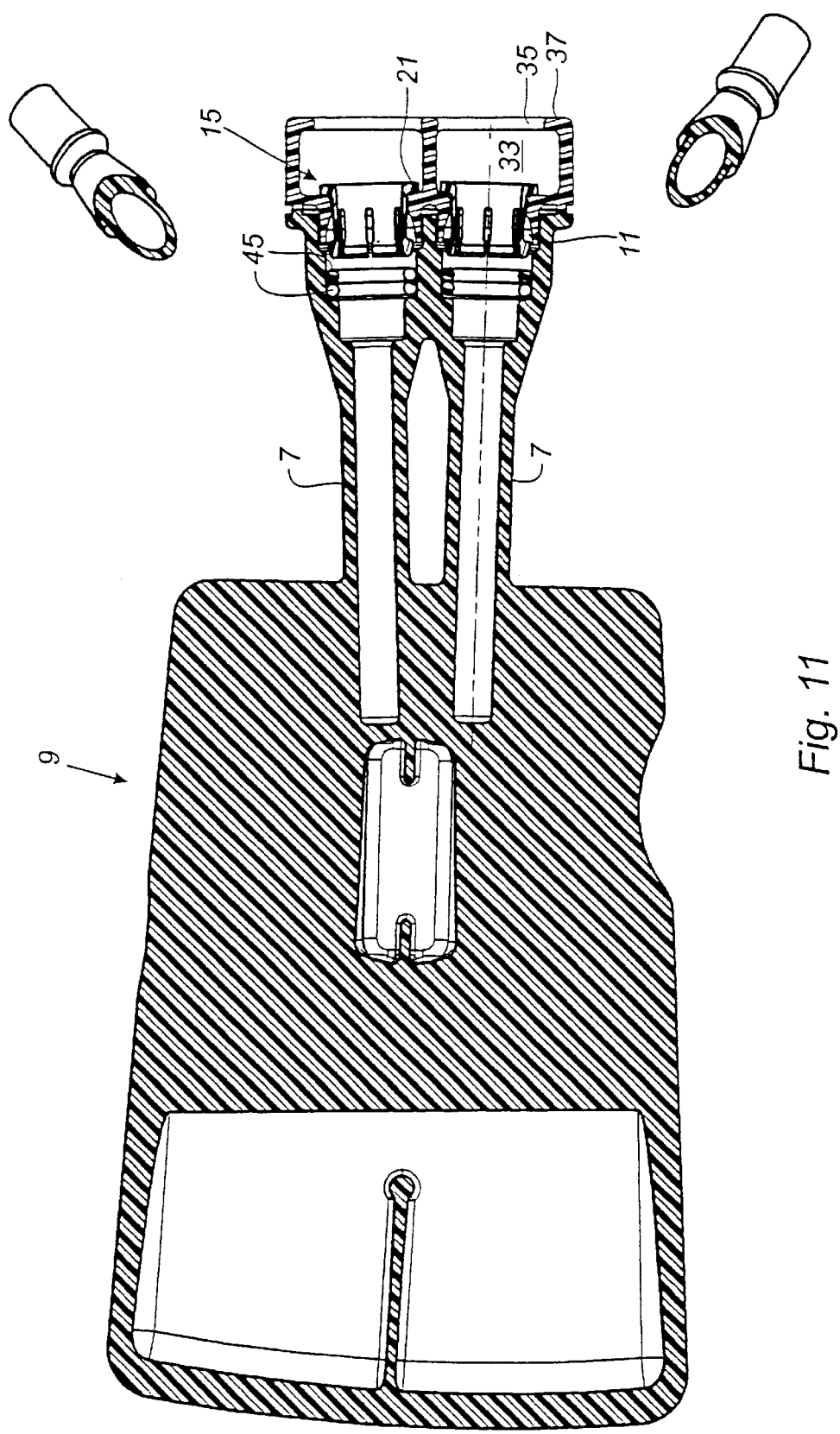
FIG. 11 is longitudinal sectional view of the preferred embodiment of a tank according to the present invention.

The tank 9 may be connected to other devices (not shown) by at least one connecting means 119, and advantageously two means, the second connecting means 121 being represented in FIG. 10.

Figure 13:
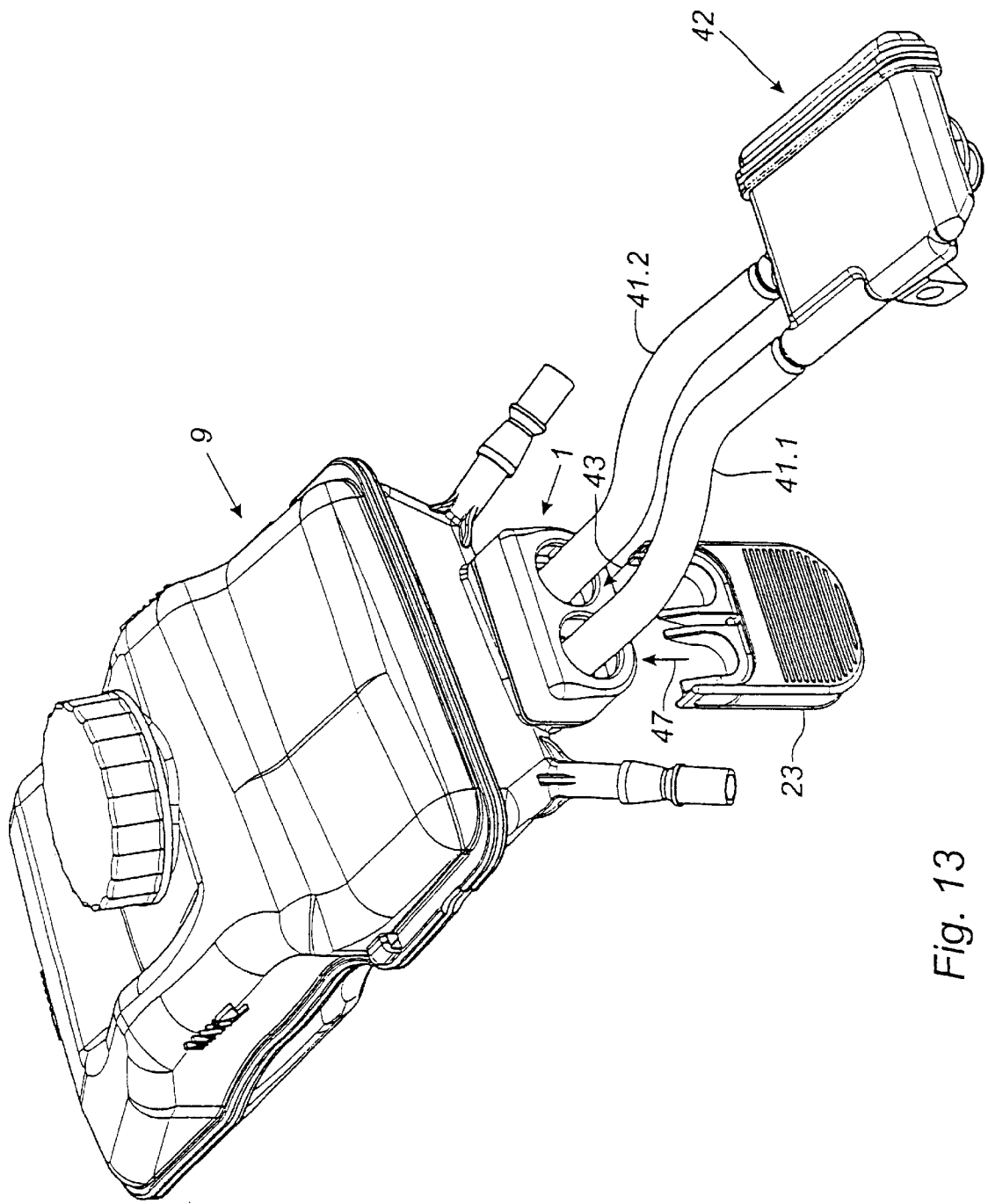
FIG. 13 is a three-quarter front perspective view of a preferred embodiment of a tank cooperating with a support for a quick connector according to the present invention.
Figure 14:
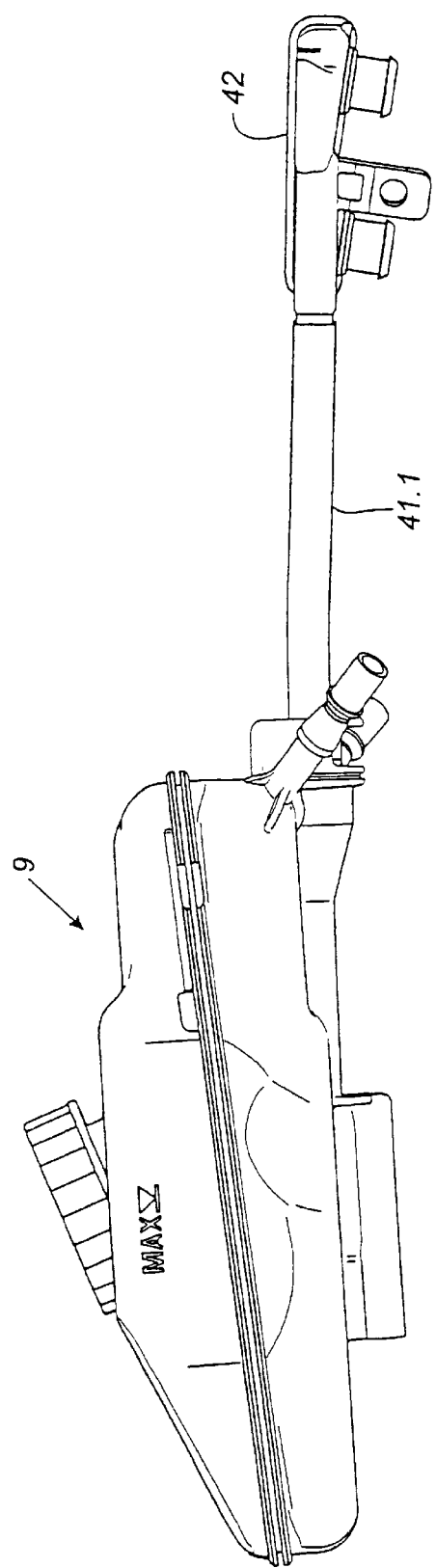
FIG. 14 is a side view of FIG. 13.
Figure 15:
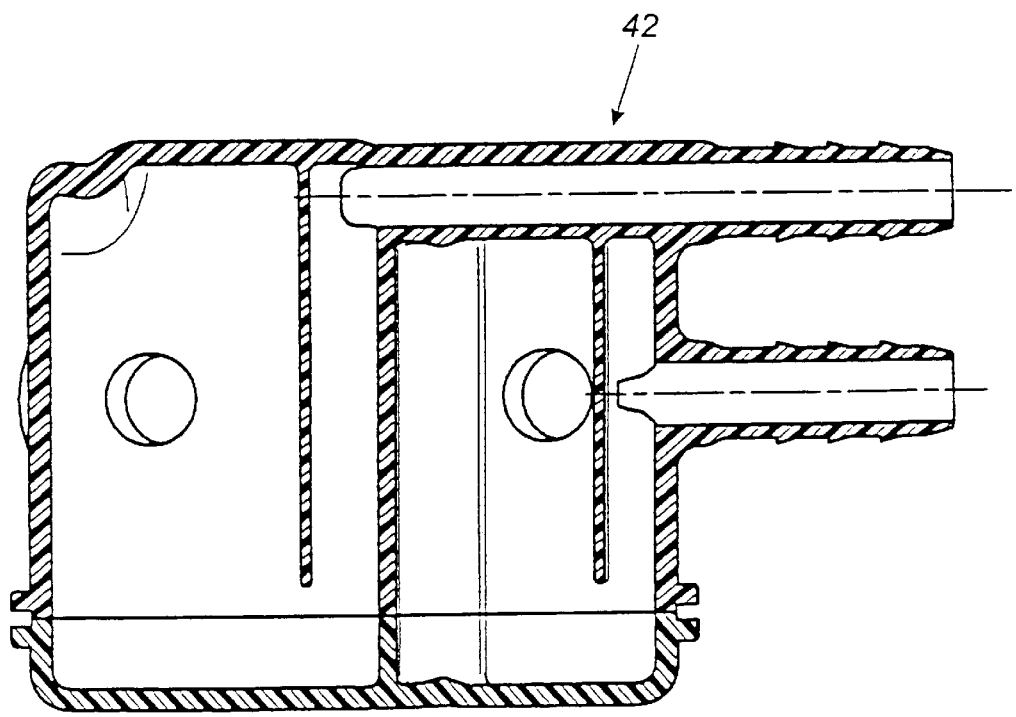
FIG. 15 is a side view of a preferred embodiment of a bottom tank of a braking system according to the present invention.
Figure 16:
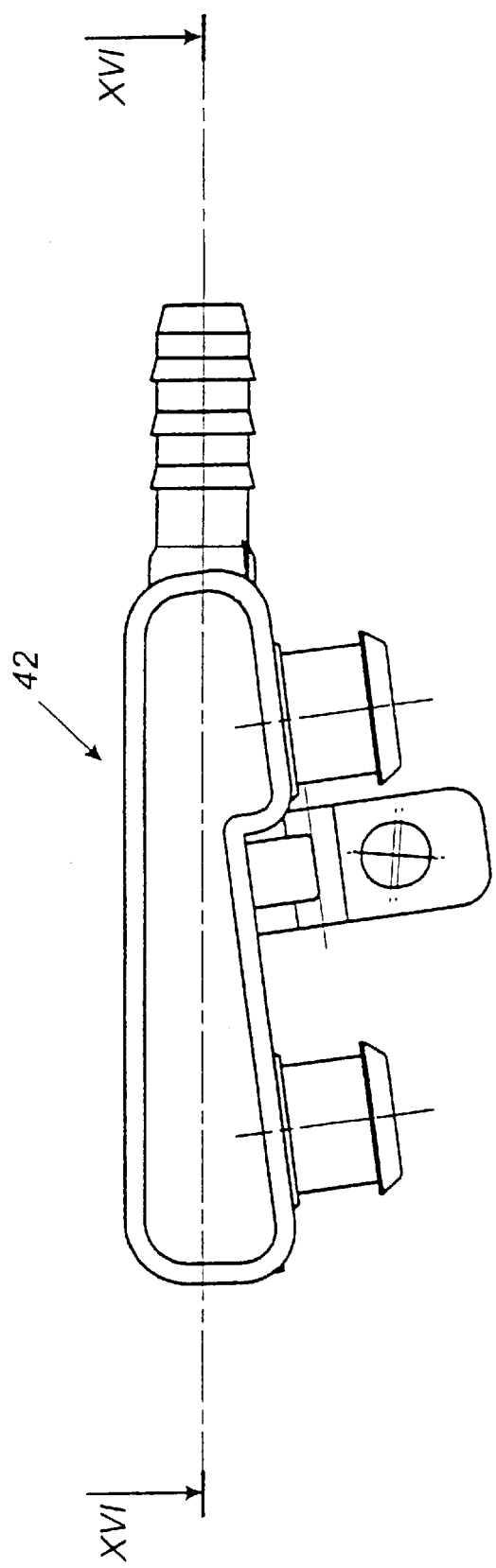
FIG. 16 is a sectional view along line XVI—XVI of FIG. 15.

FIGS. 13 and 14 show the preferred embodiment of a brake-fluid supply device according to this invention, said device comprising a first high-capacity top tank 9 the first brake-fluid chamber of which is connected by means of a first flexible tubular pipe 41.1 to a first chamber of a second bottom tank 42, whereas the second brake-fluid chamber is connected by means of a second flexible tubular pipe 41.2 to a second chamber of the second bottom tank 42. In this example, the slope of pipes 41.1 and 41.2, extending between the top tank 9 and the bottom tank is quite low, e.g. amounting to 4°. Under those circumstances, smooth pipes (41.1 and 41.2) will be used in a favourable manner, so as to avoid the formation and retention of bubbles within such pipes.

The holding capacity of the bottom tank 42 is quite lower than that of the top tank 9, i.e. the holding capacity of the bottom tank 42 should avantageously correspond to about one tenth of that of the top tank 9.

In the preferred embodiment, in a subassembling operation, the pipes 41.1 and 41.2 are mounted on the bottom tank, for instance by slipping each of them on a fir-tree grooved mouthpiece. In the motor-vehicle assembly line, the first tank 9 and the second tank 42 are rigidly fastened to their supports and the end parts of the flexible tubular pipes 41.1 and 41.2 are inserted into the through-holes 35 and 3 in the direction of the arrow 43 and they are fitted into the sleeves 5 and the claw rings 15, which keep them fixed in a position in which at least one of the seals 45 provides a tight connection. The pipes 41.1 and 41.2 may be connected to the pipes 7 of the top tank 9 either by hand or, as a variant, using a robot.

If, for instance for a maintenance operation, the pipes 41.1 and 41.2 must be disconnected, advantageously after having removed the brake fluid from the top tank 9, the disconnecting tool 23 is inserted in the direction of the arrow 47. The cheeks 29 are guided by the inner walls of the accommodating cavity 33 and the ramps 25 push back the claw ring 15 in the direction of the arrow 43, as a consequence of which the flexible tubular pipes 41.1 and 41.2 are released.

Though the use of a tool 23 permitting the simultaneous disconnection of both flexible tubular pipes 41.1 and 41.2 is quite advantageous, it should be understood that the implementation of a tool for the disconnection of the flexible tubular pipes in succession does not depart from the scope of the invention.

In an advantageous manner, the top tank 9, the bottom tank 42 and the support 1 consist of a rigid plastic, such as polypropylene, compatible with the brake fluid. The disconnecting tool 23 may be made of polypropylene or polyamide. Advantageously, the tubular pipes 41.1 and 41.2 will consist of a flexible plastic, compatible with the brake fluid.

The present invention concerns, more particularly, the motor car industry.

And the present invention mainly applies to the design and manufacturing of motor vehicle braking systems.

What is claimed is:

1. A support for a connection through which a first tank is joined with a second tank by way of first and second tubular pipes, said first tank having a first outlet pipe and a second outlet pipe, said first and second outlet pipes each having a end with a first radial inner diameter, said support being characterised by a housing with a rear wall separated from a front wall by a spacer to define first and second rectangular cavities therein, said rear wall being attached to said first tank and having a first sleeve that extends therefrom into said first outlet pipe and a second sleeve that extend therefrom into said second outlet pipe, said first sleeve defining a first through hole therein that extends from said rear wall to a first end and said second sleeve defining a second through hole therein that extends from said rear wall to a second end, said first end and second ends each having a second radial inner diameter that is smaller than said first radial inner diameter to define first and second shoulders within said first and second outlet pipes, said front wall having first and second through holes therein that are in axial alignment with said first and second through holes defined by said first and second sleeves, and first and second claw rings respectively located said first and second rectangular cavities and attached to said first and second sleeves by the engagement of radial protrusions thereon with said first and second shoulders, said first tubular pipe extending through said first through hole in said front wall and into said first outlet pipe by way of said first claw ring to define a first sealed joint through the engagement with said radial protrusions thereon and said second tubular pipe extending through said second through hole in said front wall and into said second outlet pipe by way of said second claw ring to define a second sealed joint through the engagement with said radial protrusions thereon.

2. The support as recited in claim 1 wherein said first and second rectangular cavities are characterised by defining guides for receiving a tool that engages said radial protrusions on said first and second claw rings to terminate the engagement of said first and second tubular pipes with the first and second claw rings and thereafter allow said first and second tubular pipes to be removed from said first and second outlet pipes.

* * * * *